June 5, 1956 W. N. KILNER 2,749,457
CONSTRUCTION OF DYNAMO ELECTRIC MACHINES
Filed Jan. 14, 1953 6 Sheets-Sheet 1
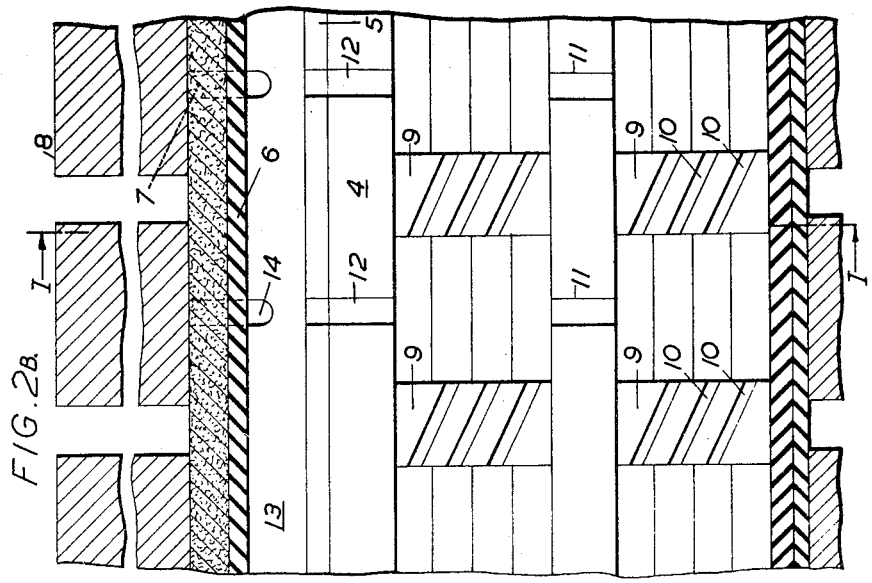
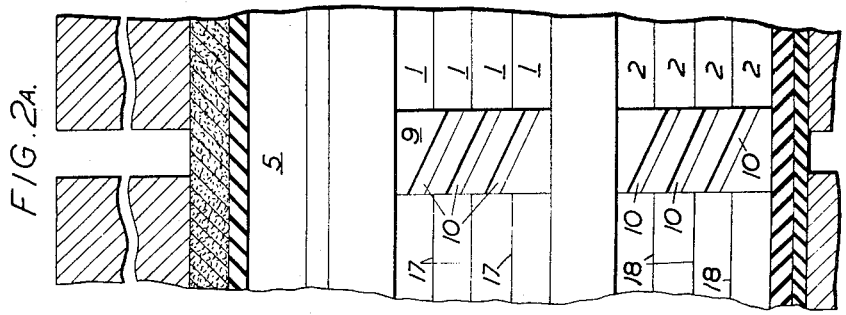
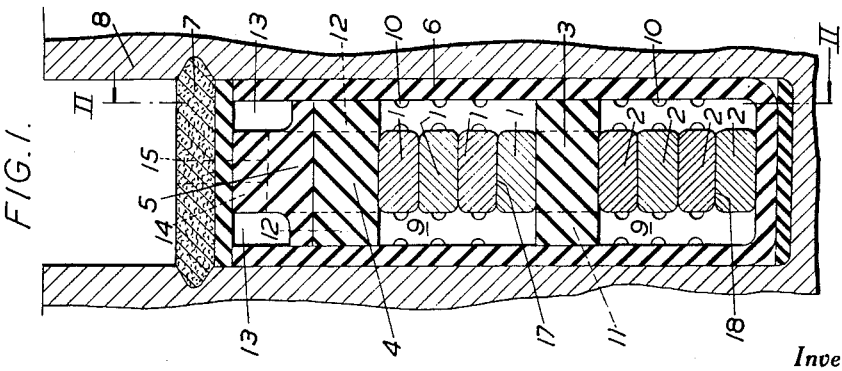
Inventor
William Norman Kilner
By
Attorneys

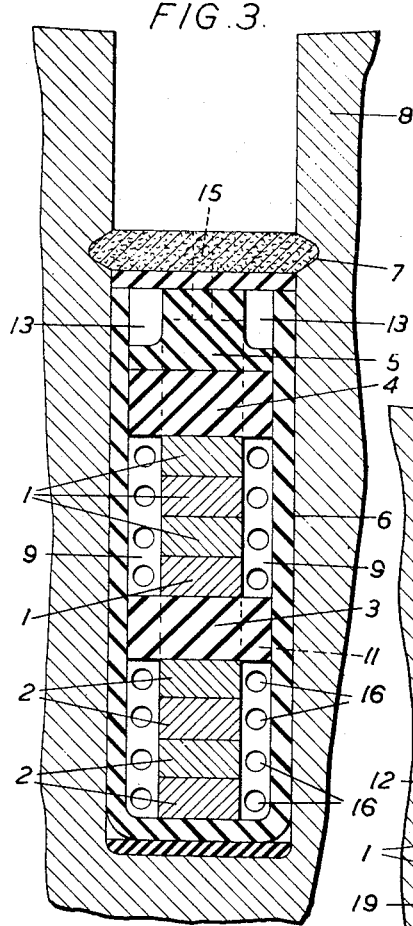
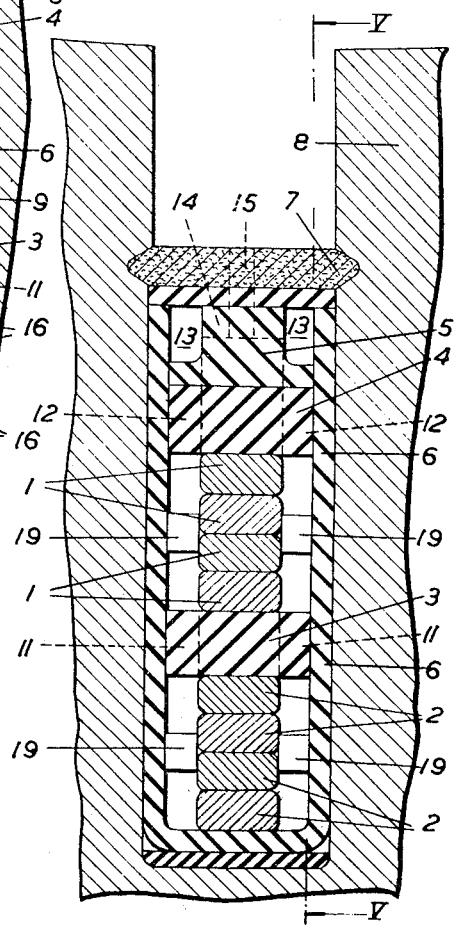

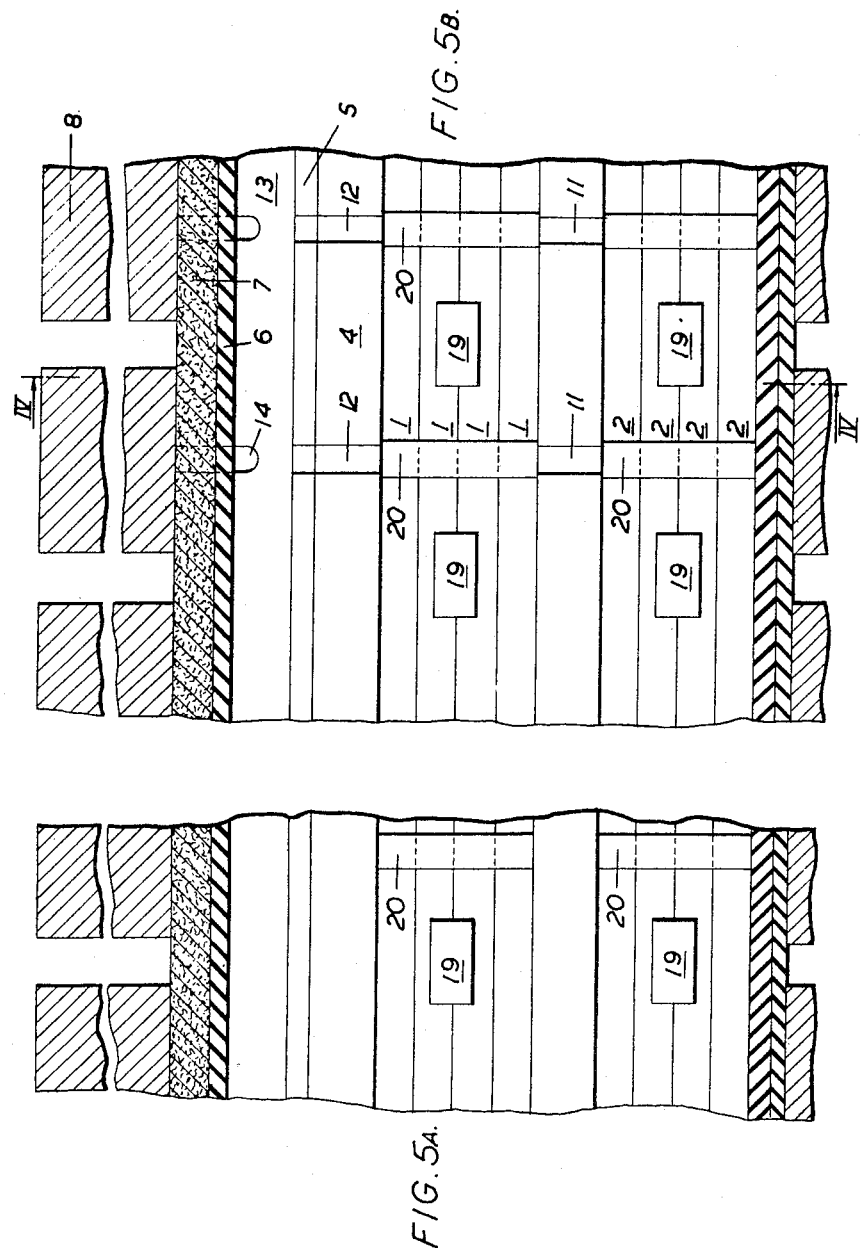

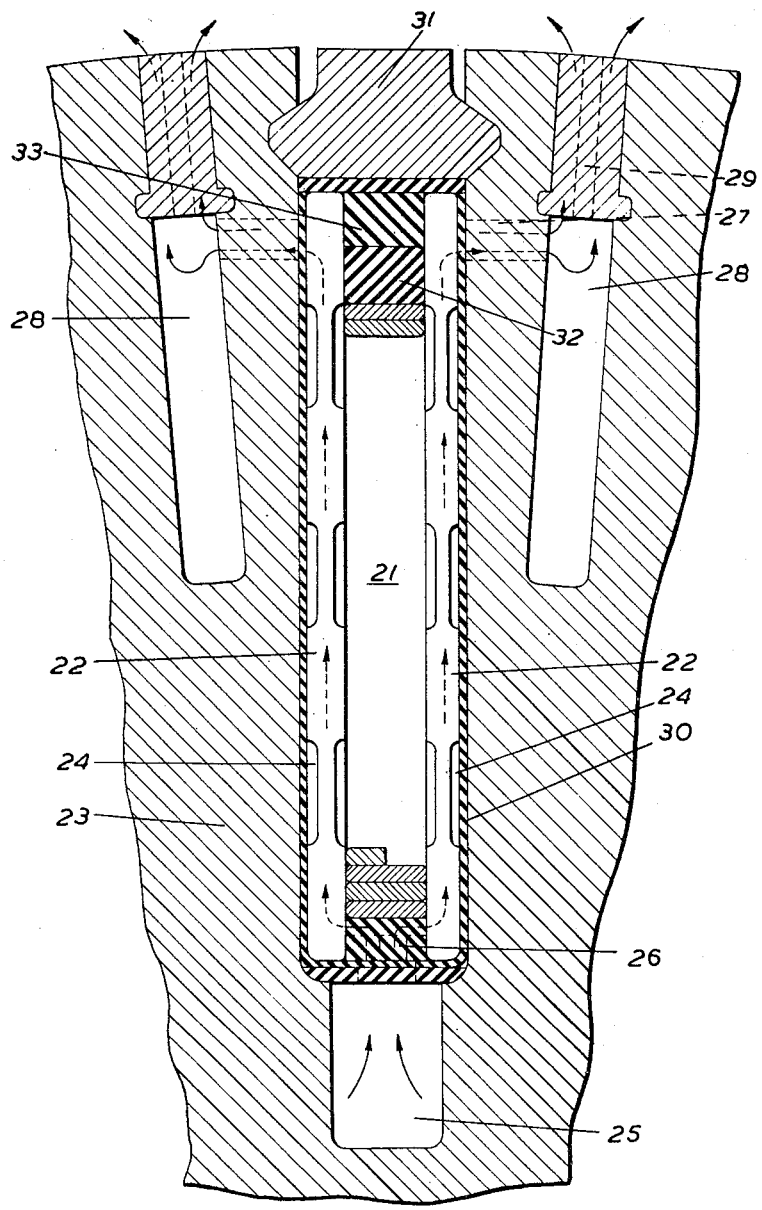

June 5, 1956 W. N. KILNER 2,749,457
CONSTRUCTION OF DYNAMO ELECTRIC MACHINES
Filed Jan. 14, 1953 6 Sheets-Sheet 5
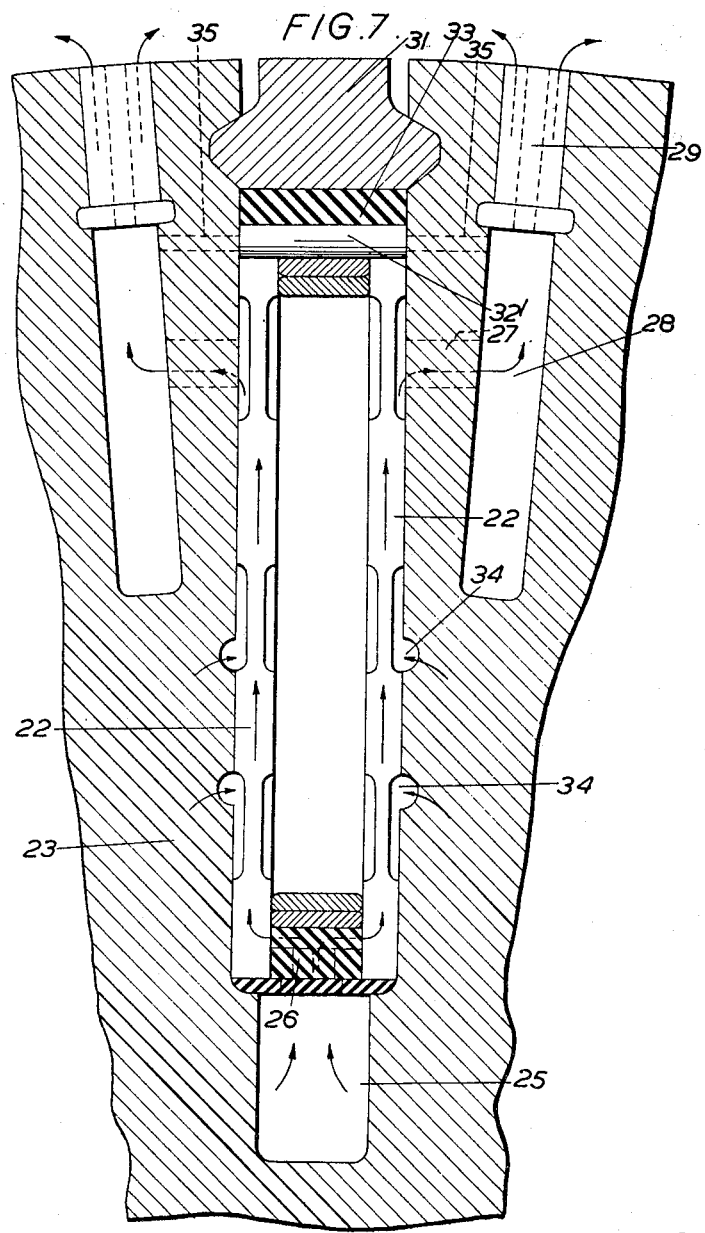
Inventor
William Norman Kilner
By Harris & Pattison
Attorneys

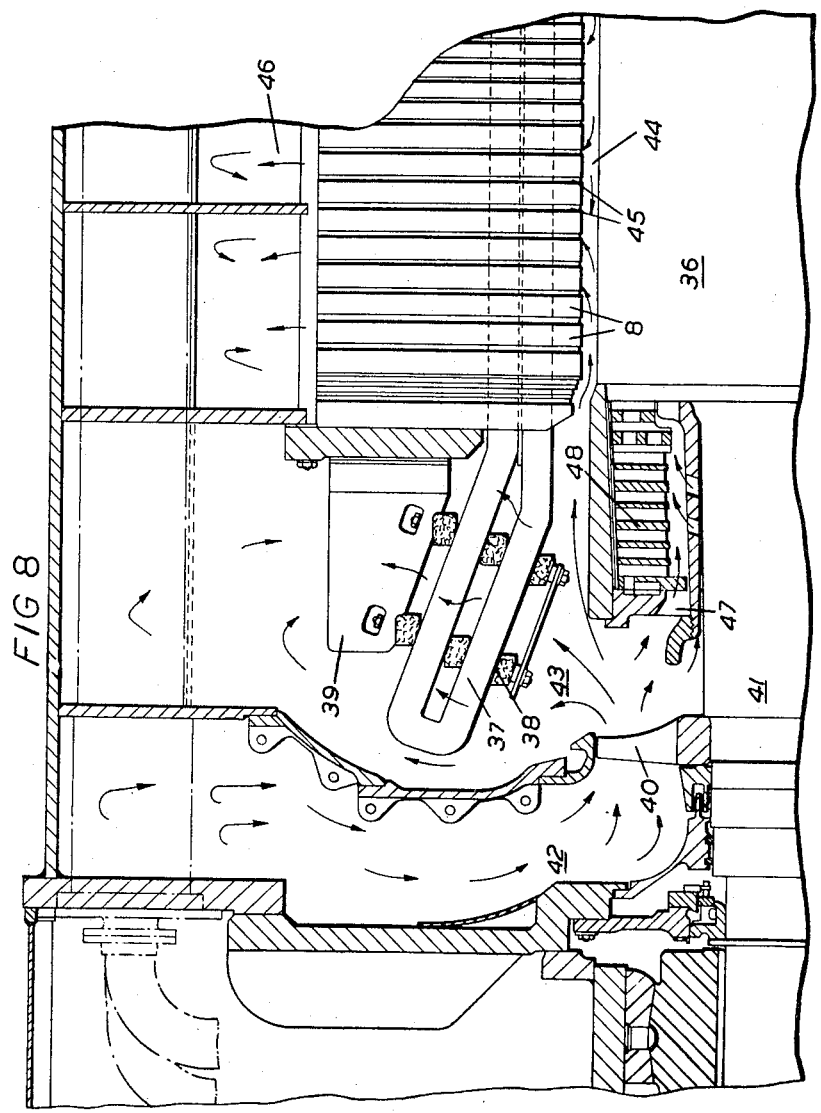

United States Patent Office 2,749,457
Patented June 5, 1956

2,749,457

CONSTRUCTION OF DYNAMO ELECTRIC MACHINES

William Norman Kilner, Hale, England, assignor to Metropolitan-Vickers Electrical Company Limited, London, England, a British company Application January 14, 1953, Serial No. 331,208

3 Claims. (Cl. 310—64)

This invention relates to dynamo electric machines and has an important application in large size turbo alternators.

At the present time the size of such machines tends towards the limit of applicable dimensions and a further increase in output is obtainable only with the aid of a more efficient method of removing heat from the windings. Hitherto the cooling of the embedded parts of the rotor windings has been effected by the circulation of cooling gas through ducts formed in the rotor teeth between the winding slots. With such an arrangement the heat generated in the conductors has to pass by conduction to the wall of the ventilating duct. This heat path includes the insulation leaving the slot, and since most good electrical insulating materials are also good insulators of heat the arrangement has its limitations.

The present invention comprises a dynamo electric machine in which the stator and/or rotor slots have distance pieces of insulating material between the conductors and the sides of the slots arranged to provide axially extending passages on both sides of the conductors, and means are provided for passing cooling gas along said passages.

It will be appreciated that with such an arrangement the cooling gas can be arranged to contact the actual conductors and thus provide for more efficient cooling.

In the case of a stator the distance pieces can be fixed in their axial positions and may be provided either with axial bores extending through them or with grooves on their side surfaces. With the latter arrangement the grooves are preferably tilted so as not to be parallel to the conductors and thereby provide ribs extending laterally across the conductors for resisting movement. Alternatively the distance pieces may extend only part of the slot height, in which case they may be bonded to the conductors. In the case of the rotor the distance pieces may consist of insulating rollers rotating about a radial axis so that any relative movement between the conductor and the surrounding sides of the slot due to thermal expansion can be allowed for. The cooling gas may, for example, be air or hydrogen.

In order that the invention may be more clearly understood, reference will now be made to the accompanying drawings, in which:

Fig. 1 is a cross-section of a stator slot embodying the present invention,

Fig. 2 is a longitudinal view of part of the stator slot, being a view taken on the line II—II of Fig. 1, Fig. 2A showing the slot construction at the end of the machine and Fig. 2B showing the slot construction midway along the machine;

Fig. 3 is a view similar to Fig. 1 but showing a different construction of spacing piece;

Fig. 4 is a similar view to Figs. 1 and 2 but showing another arrangement;

Figs. 5A and 5B are similar views to Figs. 2A and 2B but showing the arrangement of Fig. 4;

Fig. 6 is a cross-sectional view of a rotor slot;

Fig. 7 is a similar view showing an alternative arrangement suitable for a rotor, and Fig. 8 is a longitudinal sectional view of the end of a turbo alternator showing the ends of the stator and rotor.

Referring first to Figs 1 and 2, the winding as shown comprises four metal straps forming the top conductors or bars and four straps forming the bottom conductors or bars, the straps forming the top conductor being indicated by the reference 1 and those forming the bottom conductor by the reference 2. Insulation is interposed between adjacent straps. The top and bottom conductors are separated by a spacing strip 3, whilst spacing strips 4 and 5 extend over the top conductor.

The reference 6 indicates the slot lining and 7 is a wedge engaging grooves in the core 8 and holding the conductor assembly in position in the slot in accordance with normal practice. The conductor straps are spaced from each side of the slot by distance pieces 9 interposed between the sides of the conductor straps 1 and 2 and the slot lining 6. The distance pieces are spaced apart along the slots as shown in Figs. 2A and 2B, and gas passages past the distance pieces are provided by the grooves 10 formed in both sides of the distance pieces 9.

It will be observed that these grooves are not parallel to the conductors but are oblique to them so that the surfaces between the grooves provide an adequate support to resist movement. Along the mid-part of the machine radial passages 11 interconnect the passages adjacent the conductors 2 with those adjacent the conductors 1, whilst additional radial passages 12 allow the gas passages at the sides of the top conductors 1 to discharge into the axial passages 13 formed either side of the insulating strip 5. This, in turn, has cross passages 14 discharging to further radial passages 15 into the top of the slot.

In Fig. 2A, which shows the slot construction at the ends of the machine, the passages 11, 12, and 14 and the longitudinal duct 13 are omitted. This is because if the slot passages were allowed to discharge at the ends of the machine the sections of the slots along the mid-part of the machine might have an insufficient supply of cooling gas.

In Fig. 3 the construction is similar, excepting that the grooves 10 are replaced by bores 16; these can, of course, be axial. In the arrangements of Figs. 1, 2, and 3 individual conductor straps 1 are separated by insulation 17, whilst individual conductor straps 2 are separated by insulation 18; lateral movement of the conductor straps is prevented by the distance pieces.

Figs. 4 and 5 show another arrangement which is similar to the previous arrangements excepting that appreciably smaller distance pieces 19 are arranged between the conductors and the slot sides. These may be bonded to the sides of the straps to locate them in position. With such an arrangement the conductors may be held together by insulation bands 20 bonded around each set of conductor straps, the insulation bands being spaced apart along the conductors so as to leave intervening sections of conductors where the gas can contact the metal to obtain efficient cooling.

Fig. 6 shows the construction suitable for a rotor slot. In this case the conductors 21 are provided with insulating rollers 22 on each side and these are rotatable about a radial axis of the machine so that the conductors 21 can extend axially due to thermal expansion. Relative movement between the conductors 21 and the rotor body 23 will be allowed for by rotation of the rollers. Grooves 24 are formed in the rollers to provide for the axial gas flow along the slot. Gas may be fed into the slots by means of auxiliary ducts 25 extending beneath the slots and communicating through passages 26 (shown dotted) with the sides of the slots, whilst along the mid-part of the rotor gas may be discharged from the slots through the side passages 27 (shown dotted) into slots 28 in the adjacent rotor teeth, which slots in turn have discharge ports 29 leading to the periphery of the rotor.

The slots are lined with insulation 30 which must, of course, have the mechanical strength necessary to withstand the pressure of the rollers. The conductor assembly is held in the slot by a metal wedge 31 in accordance with normal practice, whilst rollers 32 are interposed between the tops of the conductors and insulating strips 33 to take the centrifugal stresses exerted by the conductors; these rollers, of course, rotate about an axis which is transverse to the slot axis.

The arrangement shown in Fig. 7 is of a similar construction to that of Fig. 6, excepting that the slot insulation 6 is dispensed with so that the rollers 22 bear directly between the metal of the rotor body and the conductors and form the insulation. In this case recesses 34 are formed in the rotor body at the sides of the slots to improve the axial gas flow, and the top rollers 32' extend the full width of the slot and are provided with additional discharge passages 35 to the ducts 28. In order to prevent the rollers coming out of the ends of the slots, stops may be provided at the ends of the gas passages, which stops may for instance comprise fixed blocks opposite the thick parts of the rollers so as not to block the gas flow.

In the case of the Fig. 7 arrangement the end rollers might be thickened and located in grooves formed in the rotor body at the sides of the slot.

In Fig. 8, the reference 8, as in the preceding figures indicates the stator core whilst 36 is the rotor (shown in outside elevation); the end turns of the stator winding are indicated by the reference 37, these end turns being separated by bracing rings 38 and being clamped against an insulating bracket 39 in accordance with well-known constructions. A fan 40 is mounted on the rotor shaft 41 and draws air in through the inlet passage 42 to the chamber 43 in which a gas pressure will be set up; this will force cooling gas into the ends of the stator slots which will pass along the sides of the conductors and out through the discharge passages 15 (Fig. 1) into the gap 44 between the rotor and stator, as described previously. From the gap some of the cooling gas will pass through the radial core gaps 45 into the discharge spaces 46 in the top of the frame. At the same time gas from the pressure chamber 43 will pass along the passage 47 below the end turns 48 of the rotor winding (shown in section) into the ends of the rotor slots and into the longitudinal ducts 25 (Figs. 6 and 7), and as in the case of the stator, the gas will discharge into the annular gap 44 between the rotor and stator.

In the case of hydrogen cooling, the gas will, of course, be recirculated after cooling. In the case of air cooling, however, it may be discharged to the atmosphere.

What I claim is:

1. A high speed turbo alternator comprising a stator and a rotor, the stator including a core having slots therein and a winding arranged in the slots in the core, said winding comprising superimposed metal straps forming top and bottom conductor bars, insulation extending across the slot between the top and bottom bars, said conductor bars being spaced on each side from the slot sides so as to define top and bottom ducts for cooling gas extending longitudinally to the slots on each side of the conductor bars, and adjacent thereto distance pieces comprising axially spaced insulating blocks inserted between the conductor bars and slot sides on both sides of the slots, said distance pieces extending radially of the machine and across the sides of all the straps of each bar so as to locate all the straps against displacement due to torque and said distance pieces having passages therethrough interconnecting the spaces at each end thereof axially, and said insulation having ports therethrough providing communication between the top and bottom ducts, means for feeding cooling gas into said slot ducts at each end of the machine, and discharge passages from the top ducts to the stator exterior.

2. A high speed turbo alternator comprising a stator and a rotor, the stator including a core having slots therein and a winding arranged in the slots in the core, said winding comprising superimposed metal straps forming top and bottom conductor bars, insulation extending across the slot between the top and bottom bars, said conductor bars being spaced on each side from the slot sides so as to define top and bottom ducts for cooling gas extending longitudinally to the slots on each side of the conductor bars, and adjacent thereto distance pieces comprising axially spaced insulating blocks inserted between the conductor bars and slot sides on both sides of the slots, said distance pieces extending radially of the machine and across the straps of each bar so as to locate the bars against displacement due to torque and said distance pieces having internal ducts therethrough interconnecting the spaces at each end thereof axially, and said insulation having ports therethrough providing communication between the top and bottom ducts, means for feeding cooling gas into said slot ducts at each end of the machine, and discharge passages from the top ducts to the stator periphery.

3. A high speed turbo alternator comprising a stator and a rotor, the stator including a core having slots therein and a winding arranged in the slots in the core, said winding comprising superimposed metal straps forming top and bottom conductor bars, insulation extending across the slot between the top and bottom bars, said conductor bars being spaced on each side from the slot sides so as to define ducts for cooling gas extending longitudinally to the slots on each side of the conductor bars, and adjacent thereto distance pieces comprising axially spaced insulating blocks inserted between the conductor bars and slot sides on both sides of the slots, said distance pieces extending radially of the machine and across the straps of each bar so as to locate the bars against displacement due to torque, the faces on at least one side of said distance pieces having ducts formed therein and interconnecting the spaces at opposite ends thereof, said ducts extending obliquely of the straps, and said insulation having ports therethrough providing communication between the ducts adjacent the top and bottom bars, means for feeding cooling gas into said slot ducts at each end of the machine, and discharge passages from said ducts between the stator and the rotor.

References Cited in the file of this patent

UNITED STATES PATENTS

| 1,913,264 | Cornu | June 6, 1933 |
| 2,605,312 | Boyer | July 29, 1952 |

FOREIGN PATENTS

| 96,244 | Switzerland | Sept. 16, 1922 |
| 447,258 | Germany | Aug. 25, 1927 |
| 593,514 | Germany | Feb. 27, 1934 |